(12) United States Patent
Brennan

(10) Patent No.: US 6,260,241 B1
(45) Date of Patent: Jul. 17, 2001

(54) SPLICING NUT FOR FORMING A LOOP IN A LINE

(76) Inventor: Stephen Brennan, 107 S. Mary Ave., Apt. #68, Sunnyvale, CA (US) 94086

( * ) Notice: Subject to any disclaimer, the term of this patent is extended or adjusted under 35 U.S.C. 154(b) by 0 days.

(21) Appl. No.: 09/395,874

(22) Filed: Sep. 14, 1999

(51) Int. Cl.⁷ ........................................ F16G 11/00
(52) U.S. Cl. .................. 24/135 R; 24/115 R; 24/115 K; 403/391
(58) Field of Search ..................... 403/391, 396, 403/209, 211, 213; 24/136 B, 122.6, 115 K, 115 H, 136 L, 136 R, 115 M, 115 R, 135 R; 29/469, 525.11

(56) References Cited

U.S. PATENT DOCUMENTS

| | | | |
|---|---|---|---|
| 356,102 | * | 1/1887 | Dumas . |
| 874,417 | * | 12/1907 | Moss . |
| 1,388,664 | * | 8/1921 | Officer . |
| 2,337,895 | * | 12/1943 | Jaszczak . |
| 2,890,510 | | 6/1959 | Spalding . |
| 3,702,709 | * | 11/1972 | Shaffer . |
| 4,112,551 | | 9/1978 | Sales . |
| 4,192,215 | * | 3/1980 | Hymans . |
| 4,295,749 | | 10/1981 | McBride . |
| 4,358,212 | * | 11/1982 | Compton . |
| 4,455,717 | | 6/1984 | Gray . |
| 4,615,532 | | 10/1986 | Biller et al. . |
| 4,723,053 | | 2/1988 | Amaya . |
| 5,383,905 | | 1/1995 | Golds et al. . |
| 6,079,895 | * | 6/2000 | Neighbors et al. . |

FOREIGN PATENT DOCUMENTS

| | | |
|---|---|---|
| 312712 | 2/1917 | (DE) . |
| 325359 | 11/1920 | (DE) . |
| 1171802 | 4/1964 | (DE) . |
| 719916 | 8/1954 | (GB) . |

OTHER PUBLICATIONS

1999 Performance Sailing Catalog, Annapolis Performance Sailing.

* cited by examiner

*Primary Examiner*—James R. Brittain
(74) *Attorney, Agent, or Firm*—Skjerven Morrill MacPherson LLP; David E. Steuber

(57) ABSTRACT

A splicing nut for securing a line or rope enables quick, lightweight, secure attachment of the line or rope end to itself so as to form a loop. The loop can be used to attach to another line or an object without the use of a knot or other attachment means or device.

23 Claims, 14 Drawing Sheets

SPLICING NUT FOR FORMING A LOOP IN A LINE

BACKGROUND

1. Field of the Invention

This invention relates to a splicing nut that can be used to secure a variety of braided ropes and lines to another object.

2. Discussion of Related Art

Various types of line, such as a common braided rope, provide a useful means of securing and controlling the distance or exerted force between two points in a variety of contexts. For example, lines are used to constrain and actuate control mechanisms on boats. Effective use of such lines normally requires a method of attaching one or both ends of the line to another object such as an eye, hook, shackle, or another line.

Current methods of attachment include several means of securing the end of the line to the line for the purpose of forming a loop. The loop is used to attach to an external object. Such means of attaching the end of the line to the line include many kinds of knots and splices. Knots are bulky and heavy and are inclined to catch or jam on surrounding objects. Splices can be difficult and costly to make, time consuming, and difficult to remove.

A need exists for a reusable attachment device than can enable quick, inexpensive, and secure attachments for lines.

SUMMARY

A splicing nut according to the present invention comprises a nut having a threaded hole and a core, the core having threads on its exterior for threading into the nut, the core also having slots into which a line can be placed before the core is threaded into the nut, such that the line is secured in the splicing nut when the core is tightened into the nut.

This invention also includes a method whereby a line is secured by a splicing nut by placing the line into slots in a core, the core having threads on its exterior, and threading the core into a nut, the nut having threads on its interior.

BRIEF DESCRIPTION OF THE FIGURES

FIG. 7 shows a plan view of the core of the embodiment shown in FIG. 1.

FIG. 11 shows a detail view of the slot in the core as referenced by FIG. 7.

DETAILED DESCRIPTION

Figure 1:
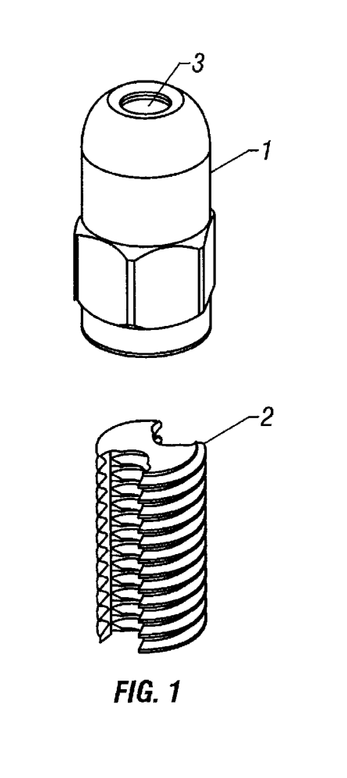
FIG. 1 illustrates a splicing nut according to the present invention.

A splicing nut according to the present invention is illustrated in FIG. 1. The splicing nut can be used to secure a line and especially to secure a loop of the line, thus allowing the loop and the line to be put in tension. The loop can be used to attach the line to an eye, a hook, or another object or line without the use of a knot or other attachment method or device.

In the first embodiment, the splicing nut is comprised of two parts, a nut 1 and a core 2.

Figure 2:
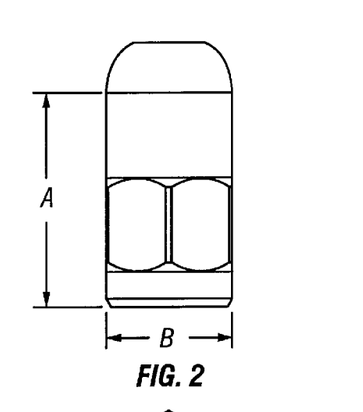
FIG. 2 shows an elevation view of the embodiment of the nut shown in FIG. 1.
Figure 3:
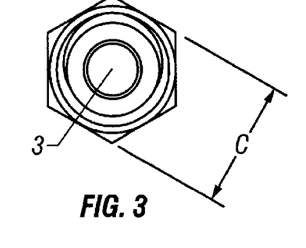
FIG. 3 shows a plan view of the nut which corresponds to the elevation view of FIG. 2.
Figure 4:
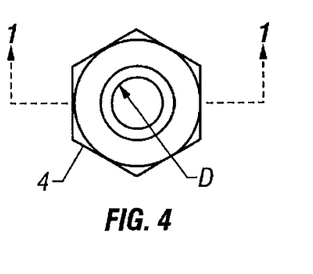
FIG. 4 shows a plan view of the nut as viewed from above the nut shown in FIG. 2.

The nut 1 of the first embodiment, shown in FIGS. 2, 3, and 4, has the general shape of a cylinder comprised of a top end, a bottom end opposite the top end, and a curved outside surface connecting the top end to the bottom end. A hole 3 extends through the nut 1 from the top end to the bottom end. The diameter of the hole 3 at the top end is large enough to allow a line to be passed through the hole 3. The diameter of the hole 3 is larger at the bottom end, allowing the core 2, described below, to be threaded into the hole 3.

In some embodiments, the generally cylindrical shape of the nut 1 is altered by smoothing the edge that connects the top end of the nut 1 and the curved outer surface. As seen in the figures, the top end and the curved outer surface comprise one continuous surface, thereby making the splicing nut less likely to become caught or entangled with other lines or objects which are in the working environment of the splicing nut.

The nut 1 also has a plurality of flat surfaces or faces 4, preferably six or eight, which comprise a shape which can be accommodated by a common wrench. The shape formed by the combination of the faces 4 can, for example, form a hexagon as seen in FIG. 4.

Figure 5:
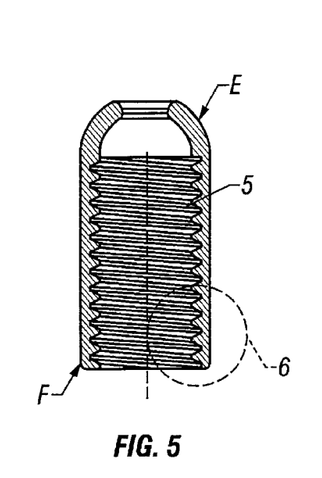
FIG. 5 shows a section view of the embodiment of the nut shown in FIG. 1 as referenced by line 1—1 in FIG. 4.
Figure 6:
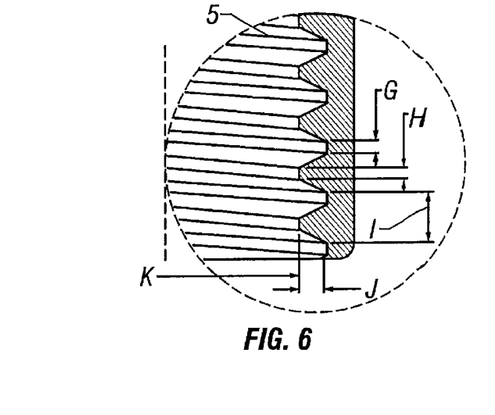
FIG. 6 shows a partial view of the nut threads as referenced by FIG. 5.

FIG. 5, a section view of the nut 1 as referenced by line 1—1 of FIG. 4, shows internal nut threads 5 which are used to attach to the core 2. An enlarged view of the internal nut threads 5 is shown in FIG. 6.

Illustrative dimensional specifications for the nut 1 as shown in FIGS. 2–6 are provided in Table I below. Table I provides one possible set of dimensions for a nut 1 which can be used in a splicing nut that is used for securing a ⅜ inch diameter line. The nut 1 described by the dimensions presented in Table I can also be used for securing lines of other sizes by using a properly designed core 2.

TABLE I

|   | Broad (inches) | Preferred (inches) |
|---|---|---|
| A | 1.490–1.510 | 1.500 |
| B | 0.910–0.930 | 0.920 |
| C | 0.920–0.940 | 0.930 |
| D | 0.365–0.385 | 0.375 |
| E | 0.450–0.470 | 0.460 |
| F | 0.040–0.060 | 0.050 |
| G | 0.247–0.253 | 0.25 |
| H | 0.247–0.253 | 0.25 |
| I | 0.119–0.125 | 0.122 |
| J | 0.060–0.066 | 0.063 |
| K | 0.667–0.673 | 0.670 |

Figure 8:
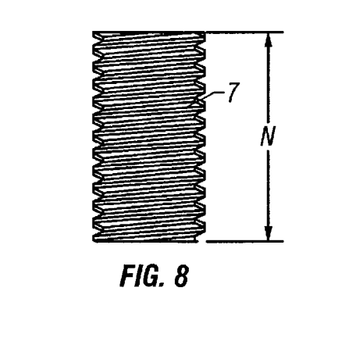
FIG. 8 shows an elevation view of the core that is orthogonal to FIG. 7.
Figure 9:
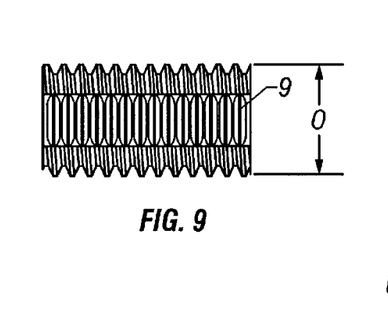
FIG. 9 shows an elevation view of the core that is orthogonal to FIG. 7.
Figure 13:
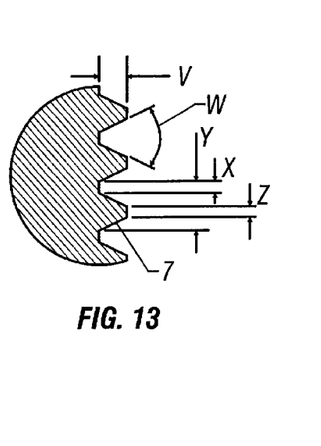
FIG. 13 shows a detail view of the threads of the core as referenced by FIG. 10.

A plan view of the core 2 is shown in FIG. 7. FIGS. 8 and 9 show the sides of the core 2. As shown in FIG. 8, the core 2 has external core threads 7 at the perimeter of the core 2 along the length of the core 2. The external core threads 7 complement the internal nut threads 5 so that the external core threads 7 secure the core 2 inside the nut 1 when the core 2 is screwed into the nut 1. An enlarged view of the external core threads 7 is shown in FIG. 13, as referenced by FIG. 10.

The core 2 has two slots 6 that are open to the sides of the core 2 as also shown in FIG. 7. Different embodiments of the present invention may comprise any number of slots 6, and the slots 6 may have a variety of shapes. In one embodiment, each of slots 6 contains a centering groove 6A which prevents the line from sliding from side to side in the slot. The purpose of the slots 6 is to provide regions in the core 2 where the line may be laid, such regions also allowing the line to be exposed to the inside surface of the nut 1 when the core 2 is threaded into the nut 1. Threading the core 2 into the nut 1 causes the line to be compressed between the slots 6 and the nut 1. Such compression holds the line tightly, resisting movement of the line. When a loop of the line is formed between slots 6, the loop is secured when the core 2 is threaded into the nut 1. The use of multiple slots 6 allows the line to be secured at a plurality of points. This increases the total gripping strength of the splicing nut. Additionally, a minimum of two slots 6 capable of gripping the line is necessary to secure a loop of the line and ensure that tension on the line does not tighten the loop so far that the minimum bending radius of the line is exceeded. It is recognized that an additional slot(s) 6 could be incorporated in the design of the core 2. A third slot would provide an additional region where the line could be laid and gripped between the slots 6 and the nut 1, thus providing additional holding strength.

Figure 10:
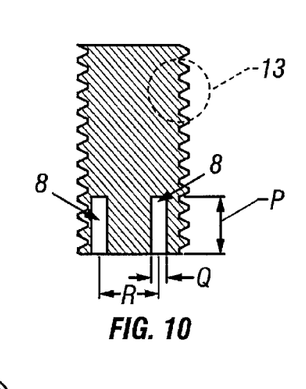
FIG. 10 shows a section view of the core as referenced by line 2—2 of FIG. 7.
Figures 54, 55:
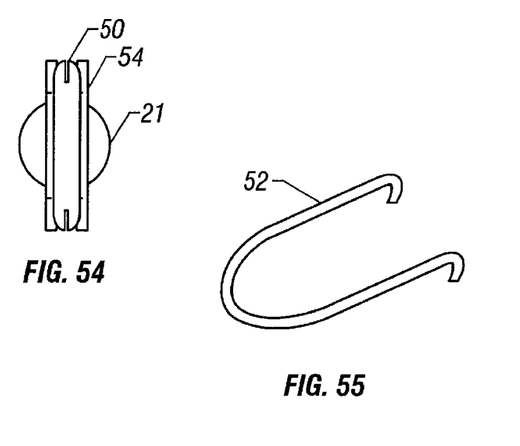
FIG. 54 shows an elevation view of the thimble, splicing nut, and line of FIG. 52.
FIG. 55 shows a perspective view of wire spanners.

FIG. 10, a section view of the core 2 as referenced by line 2—2 of FIG. 7, shows two holes 8 which extend into the bottom of the core 2. The holes 8 can accommodate a gripping tool to allow a torsion force to be applied to the core 2 when it is screwed into the nut 1 For example, the core 2 can be gripped using wire spanners as shown in FIG. 55.

Figures 12, 14:
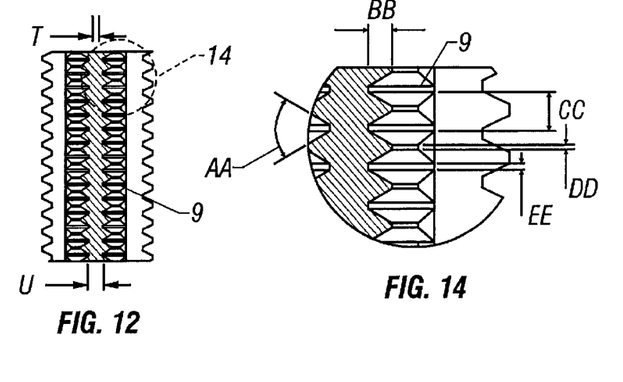
FIG. 12 shows a section view of the core as referenced by line 3—3 of FIG. 7.
FIG. 14 shows a detail view of the core as referenced by FIG. 12.
Figure 15:
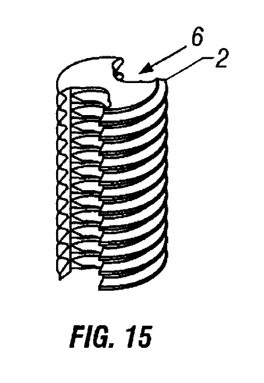
FIG. 15 shows a perspective view of the core shown in FIG. 7.

FIG. 11 shows an enlarged view of one slot 6 as referenced by FIG. 7. The slot 6 has ribs 9 that extend perpendicular from the sides of the slot 6. The ribs 9 cause the line to be gripped tightly by creating additional compressive force on the line when the line is passed through the slots 6 and the core 2 is threaded into the nut 1 The ribs 9 are shown in FIG. 9 and FIG. 12, a section view as referenced by line 3—3 of FIG. 7. In the embodiment shown, the ribs 9 resemble an internal thread pattern, though the ribs 9 can be of a variety of designs, including sawtooth, gnarled, or irregularly roughened surfaces. An enlarged view of the ribs 9 is shown in FIG. 14 as referenced by FIG. 12. A perspective view of the core 2 is shown in FIG. 15.

Illustrative dimensional specifications for the core 2 as shown in FIGS. 7–14 are provided in Table II below. Table II provides one possible set of dimensions for a core 2 which can be used in a splicing nut that is used for securing a ⅜ inch diameter line.

TABLE II

|    | Broad (inches) | Preferred (inches) |
| --- | --- | --- |
| L  | 0.235–0.255 | 0.245 |
| M  | 0.205–0.225 | 0.215 |
| N  | 1.490–1.510 | 1.500 |
| O  | 0.776–0.796 | 0.786 |
| P  | 0.365–0.385 | 0.375 |
| Q  | 0.115–0.135 | 0.125 |
| R  | 0.440–0.460 | 0.450 |
| S  | 0.365–0.385 | 0.375 |
| T  | 0.055–0.035 | 0.055 |
| U  | 0.185 | 0.185 |
| V  | 0.058–0.063 | 0.063 |
| W  | 60° ± 0.5° | 60.051° |
| X  | 0.247–0.253 | 0.25 |
| Y  | 0.119–0.125 | 0.122 |
| Z  | 0.021–0.027 | 0.024 |
| AA | 60.0° | 60.0° |
| BB | 0.055–0.075 | 0.065 |
| CC | 0.093–0.113 | 0.103 |
| DD | 0.002–0.022 | 0.012 |
| EE | 0.005–0.025 | 0.015 |

Figure 16:
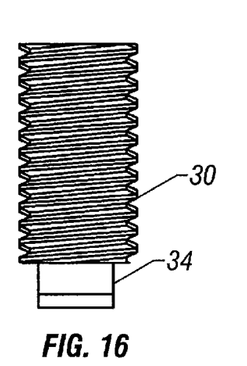
FIG. 16 shows an elevation view of a core of another embodiment.
Figure 17:
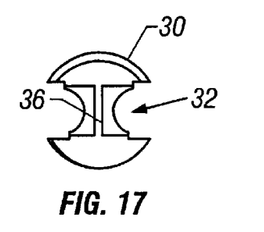
FIG. 17 shows a plan view of the core that corresponds to FIG. 16 as viewed from above.
Figure 18:
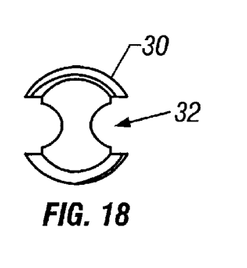
FIG. 18 shows a plan view of the core that corresponds to FIG. 16 as viewed from below.
Figure 19A:
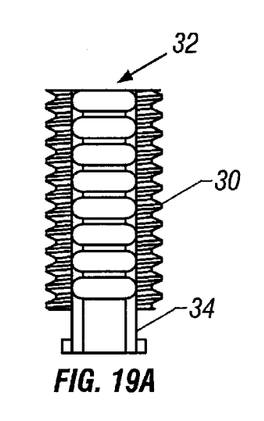
FIG. 19A shows an elevation view of the core orthogonal to FIG. 16.
Figure 19B:
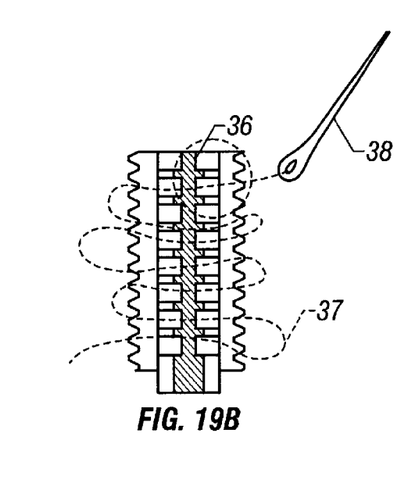
FIG. 19B shows an arrangement of the core wherein a rope is sewn to the core with a thread.
Figure 20:
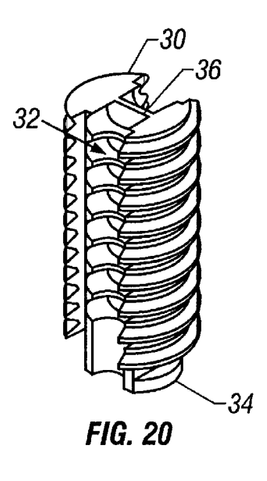
FIG. 20 is a perspective view of the core shown in FIG. 16.
Figure 21:
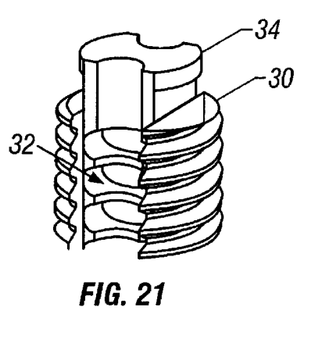
FIG. 21 shows a partial perspective view of the core shown in FIG. 16.

An alternative design of the core is shown in FIGS. 16–21. FIG. 16 is an elevation view of a core 30, which may be easier to machine and has an inner gripping surface 32 that may provide better rope-gripping capability. The core 30 shown in FIG. 16 is longer than the core shown in FIGS. 7–14 and also has a bottom section 34 that does not have threads and is shaped to accommodate a common wrench. FIGS. 17 and 18 are plan views of the core 30 that correspond to FIG. 16 as viewed from above and below respectively. Holes 8 may be omitted from the core 30 as shown in FIG. 18. FIG. 19A is an elevation view of the core 30 that is orthogonal to the view shown in FIG. 16. FIG. 19B shows how the inner wall 36 may be made thin enough to allow the rope to be sewn to the the core with a thread 37 that is stitched through inner wall 36 using a needle 38, producing an embodiment capable of withstanding very high stresses. FIG. 20 is a perspective view of the core 30 shown in FIG. 16. FIG. 21 is a partial perspective view of the core 30 shown in FIG. 16. FIG. 21 shows the bottom section of the core 30 which is shaped to accommodate a gripping tool such as a wrench.

Figure 22:
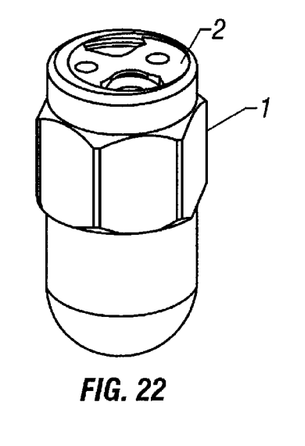
FIG. 22 shows a perspective view of the embodiment of the splicing nut shown in FIG. 1 with the core fully inserted.
Figure 23:
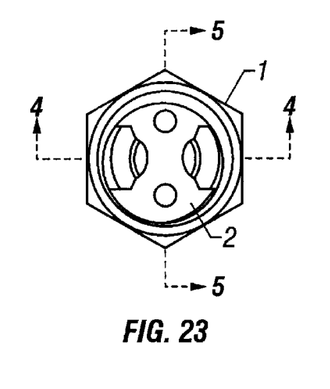
FIG. 23 shows a plan view that corresponds to the perspective view of FIG. 22.
Figure 24:
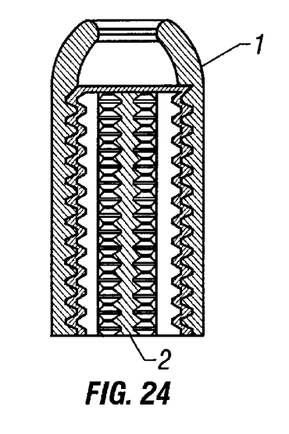
FIG. 24 shows a section view of the splicing nut as referenced by line 4—4 of FIG. 23.
Figure 25:
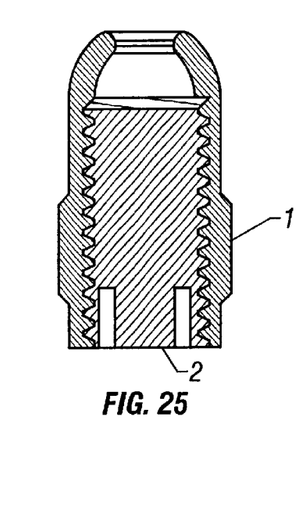
FIG. 25 shows a section view of the splicing nut as referenced by line 5—5 of FIG. 23.

FIGS. 22 to 25 show the first embodiment of the present invention with the nut 1 and core 2 assembled. For clarity, a line is not shown in the figures. FIG. 22 shows a perspective view of the assembled splicing nut. FIG. 23 shows a plan view and lines 4—4 and 5—5 which reference section views shown in FIG. 24 and FIG. 25 respectively.

Figure 26:
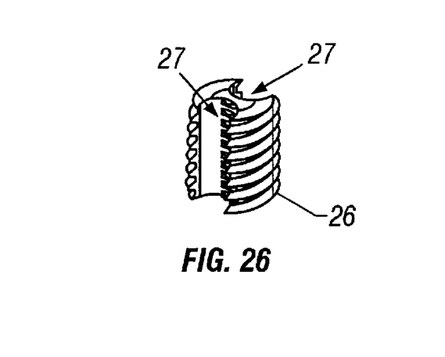
FIG. 26 shows an exploded perspective view of a second embodiment of the invention which includes a nut housing, nut inserts, and a core.

A second embodiment of the present invention comprises four parts as shown in FIG. 26, an exploded view. A nut housing 21 is similar to the nut 1 of the first embodiment. The nut housing 21 includes a hole 22 and a plurality of gripping faces 23. The primary difference between the nut 1 and nut housing 21 is that the nut housing 21 does not have internal threads into which a core 26 may be screwed. Instead, nut inserts 24A and 24B are inserted into the nut housing 21. The nut inserts 24A and 24B are identical and fit in the shape of a common nut, such as is used to attach to a bolt. The outside shape of the nut inserts 24A and 24B match the shape of the bottom section of the hole 22 in the nut housing 21 so that the nut inserts 24a and 24B are secured in the nut housing 21 and prevented from rotating therein. The nut inserts 24A and 24B have internal threads 25 into which the core 26 screws. A preferred number of nut inserts 24A and 24B is two, as shown in the embodiment shown in FIGS. 20–39. Alternatively, the nut inserts 24A and 24B may comprise a single part, or a plurality of more than two nut inserts 24A and 24B may be used. The use of nut inserts 24A and 24B, especially two nut inserts 24A and 24B, simplifies the splicing nut manufacturing process, especially if the splicing nut components are to be molded. The core 26 of the second embodiment is substantially similar to the core 2 of the first embodiment.

Figure 27:
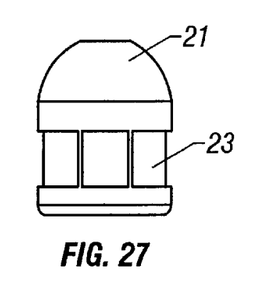
FIG. 27 shows an elevation view of the assembled embodiment of the splicing nut shown in FIG. 26.
Figure 28:
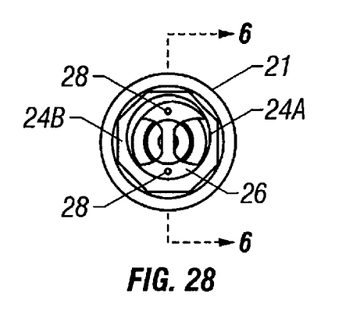
FIG. 28 shows a plan view of the splicing nut that corresponds to FIG. 27 as viewed from below.
Figure 29:
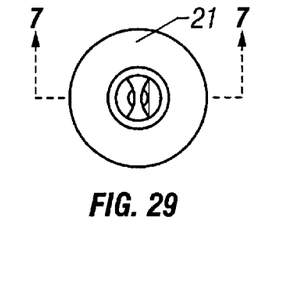
FIG. 29 shows a plan view of the splicing nut that corresponds to FIG. 27 as viewed from above.
Figure 30:
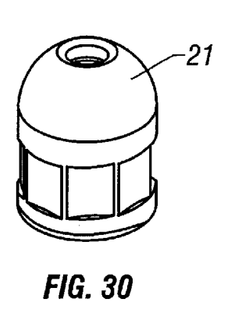
FIG. 30 shows a perspective view of the assembled embodiment of the splicing nut shown in FIG. 26.
Figure 31:
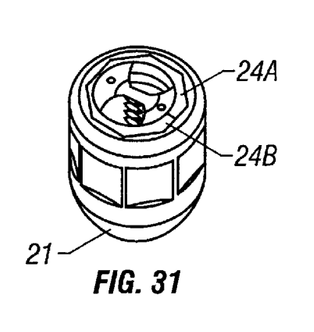
FIG. 31 shows another perspective view of the assembled embodiment of the splicing nut shown in FIG. 26.

FIGS. 27–31 show the second embodiment as assembled without the line. FIG. 27 is an elevation view. FIGS. 28 and 29 are plan views, orthogonal to FIG. 27, showing the bottom and top of the splicing nut respectively. FIGS. 30 and 31 are perspective views of the assembled splicing nut of the second embodiment.

Figure 32:
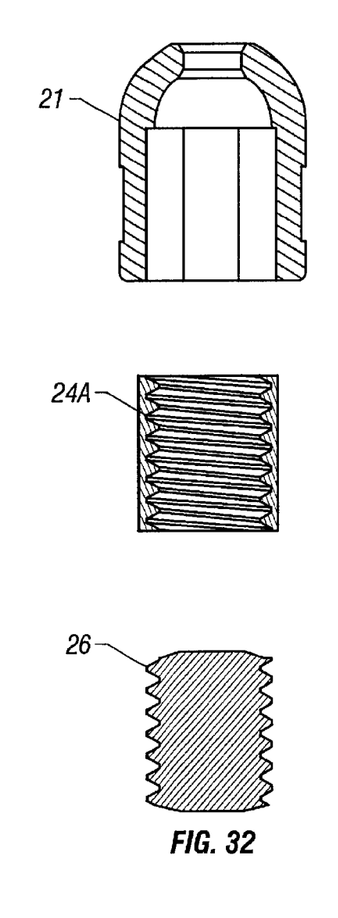
FIG. 32 shows an exploded section view of the splicing nut as referenced by line 6—6 of FIG. 28.
Figure 33:
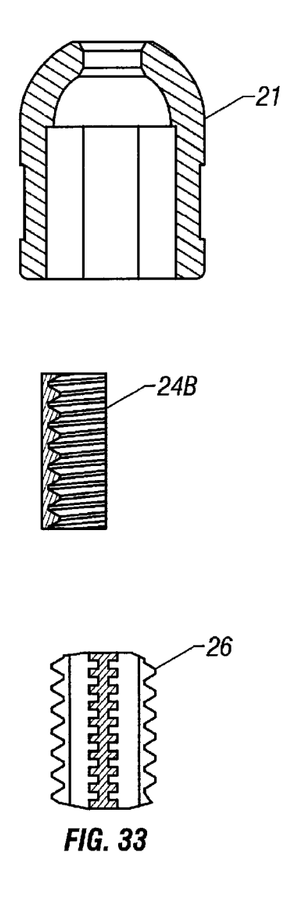
FIG. 33 shows an exploded section view of the splicing nut as referenced by line 7—7 of FIG. 29.

FIGS. 32 and 33 are exploded section views as referenced by line 6—6 of FIG. 28 and line 7—7 of FIG. 29 respectively. FIG. 33 shows only one nut inserts 24A to clearly show the separation of the nut inserts 24A and 24B.

Figure 34:
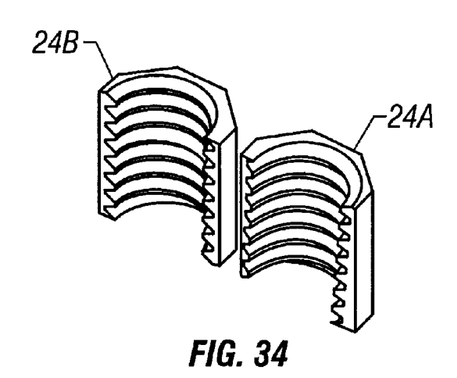
FIG. 34 shows a perspective view of the disassembled nut inserts.
Figure 35:
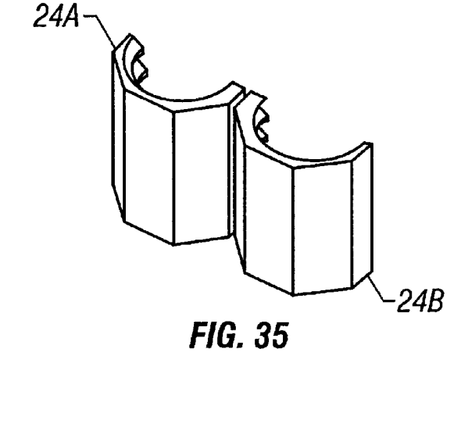
FIG. 35 shows another perspective view of the disassembled nut inserts.
Figure 36:
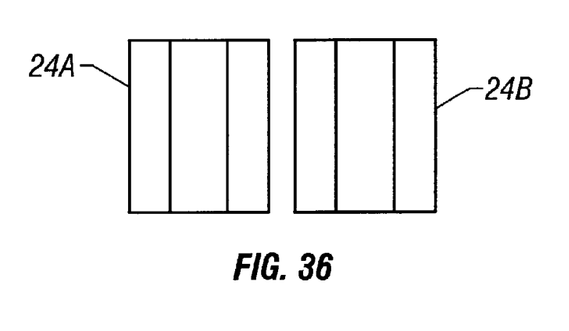
FIG. 36 shows an elevation view of the disassembled nut inserts.
Figure 37:
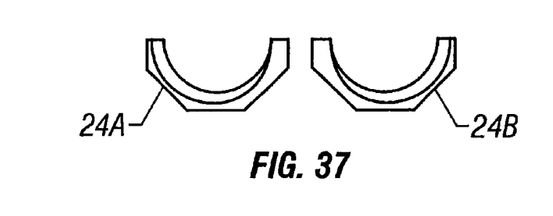
FIG. 37 shows a plan view of the disassembled nut inserts that corresponds to FIG. 36.
Figure 38:
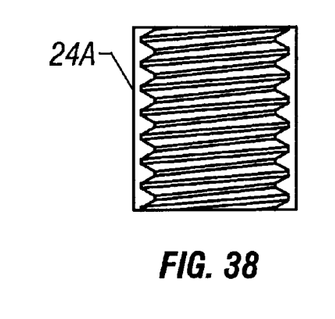
FIG. 38 shows an elevation view of one nut insert.

FIGS. 34–38 show various views of the nut inserts 24A and 24B. FIGS. 34 and 35 are perspective views, shown with the nut inserts 24A and 24B separated. FIG. 37 is a plan view. FIGS. 36 and 38 are elevation views, orthogonal to FIG. 37. Only one of the nut inserts 24A is shown in FIG. 38.

Figure 39:
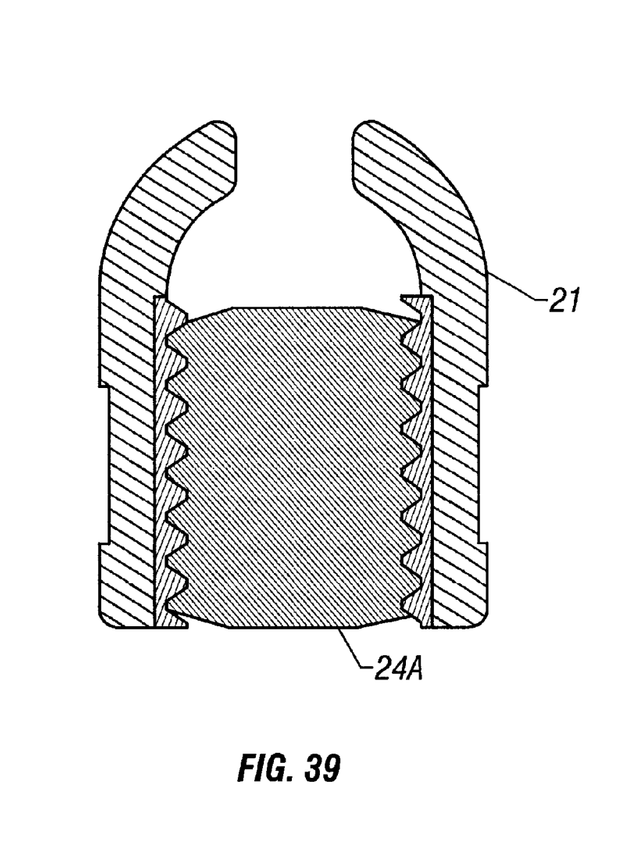
FIG. 39 shows a section view of the assembled splicing nut as referenced by line 6—6 of FIG. 28.
Figure 40:
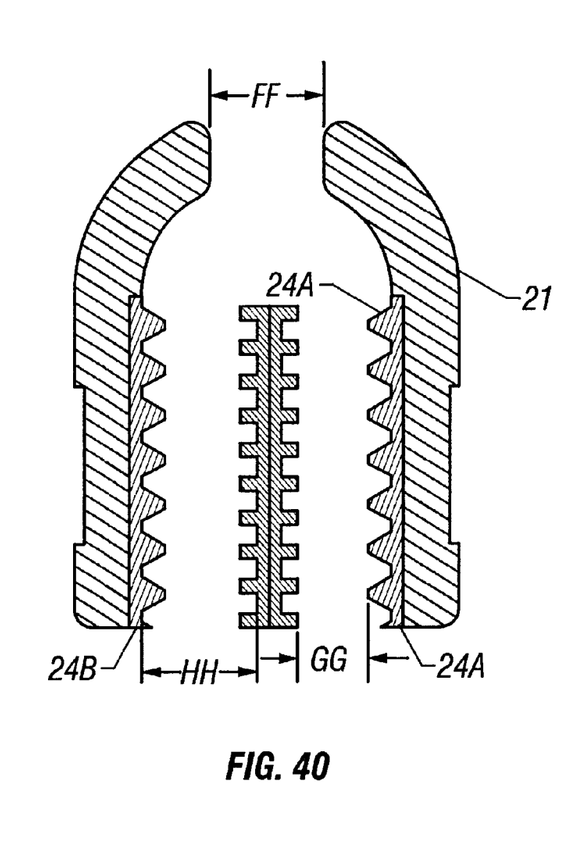
FIG. 40 shows a section view of the assembled splicing nut as referenced by line 7—7 of FIG. 29.
Figure 41:
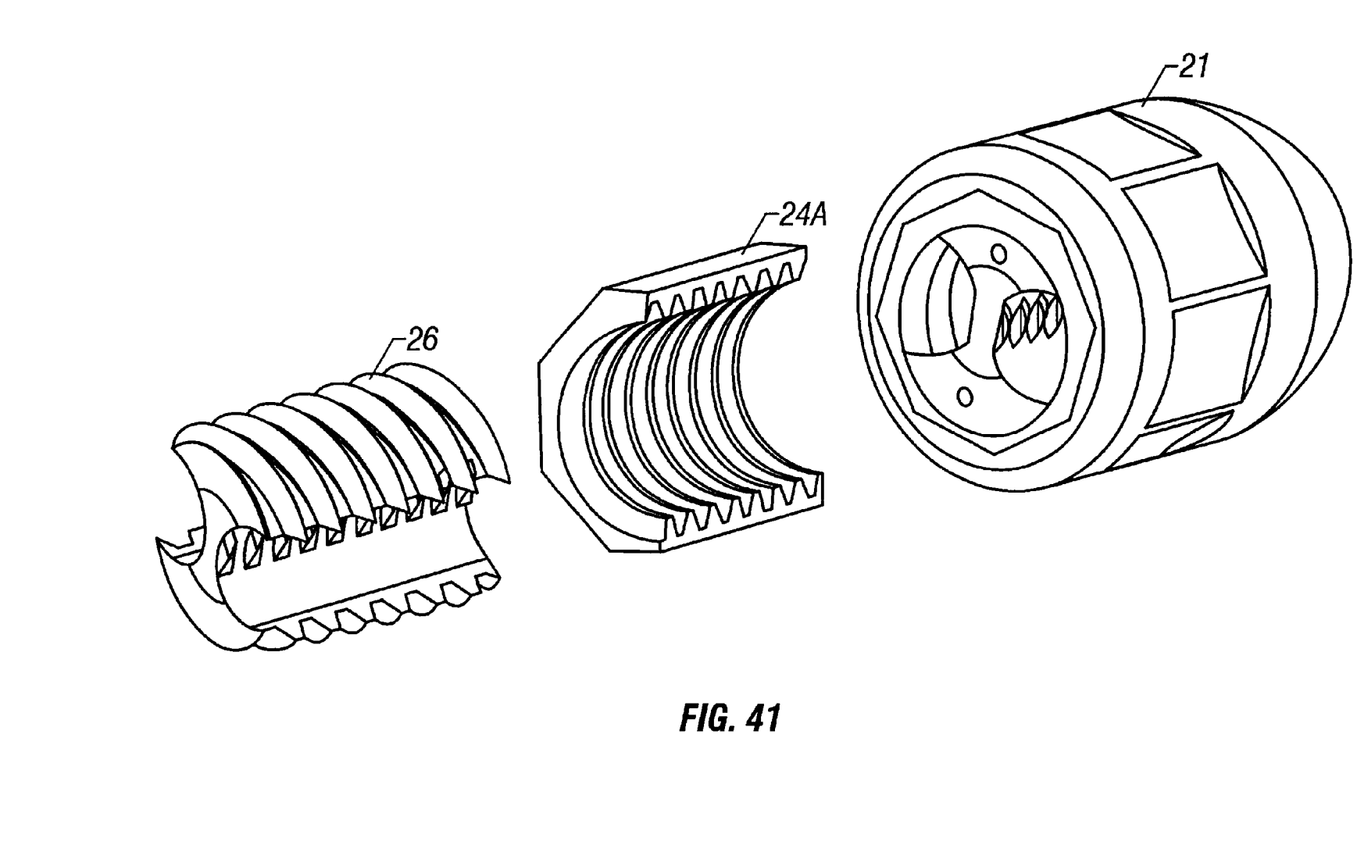
FIG. 41 shows an exploded view of the embodiment of FIG. 26.

FIGS. 39 and 40 are section views of the assembled nut housing 21 and nut inserts 24A and 24B as referenced by line 6—6 of FIG. 28 and line 7—7 of FIG. 29 respectively. The core 26 is not shown.

Illustrative dimensional specifications for the nut housing 21 and nut inserts 24A and 24B as shown in FIG. 40 are provided in Table III below. Table III provides one possible set of dimensions for a nut housing 21 and nut inserts 24A and 24B which can be used in a splicing nut that is used for securing a ⅜ inch diameter line.

TABLE III

|    | Broad (inches) | Preferred (inches) |
| --- | --- | --- |
| FF | 0.365–0.385 | 0.375 |
| GG | 0.225–0.245 | 0.235 |
| HH | 0.350–0.370 | 0.360 |

The splicing nut components may be formed from a variety of materials. These materials include, but are not limited to, plastic, metal, wood, rubber, composite materials, and a combination of such materials. The preferred method of manufacture is a molding process, and the preferred materials are those that can be molded, especially those plastics which can be molded. The chosen material should be one that offers strength, stiffness, durability, lightness of weight, resistance to water and chemicals, or a combination of some or all of these characteristics.

The splicing nut can be used to secure a variety of lines. The lines may be braided, cored or uncored, formed from synthetic or natural materials, and of any diameter, weight, and strength. Examples include common ropes and stretch cords, such as those used in boating and sailing applications. The splicing nut may be specially designed to accommodate a line of a certain type or size, or the splicing nut may accommodate a range of sizes of line and a variety of types of line.

Additionally, the splicing nut components may be designed to be interchangeable so that, for example, one nut housing 21 may be compatible with a number of different nut inserts 24A and 24B or cores 26. Thus a single nut housing 21 can be common to a number of splicing nuts, simplifying the manufacturing process and reducing the necessary stock of components necessary for securing a variety of lines.

Figure 42:
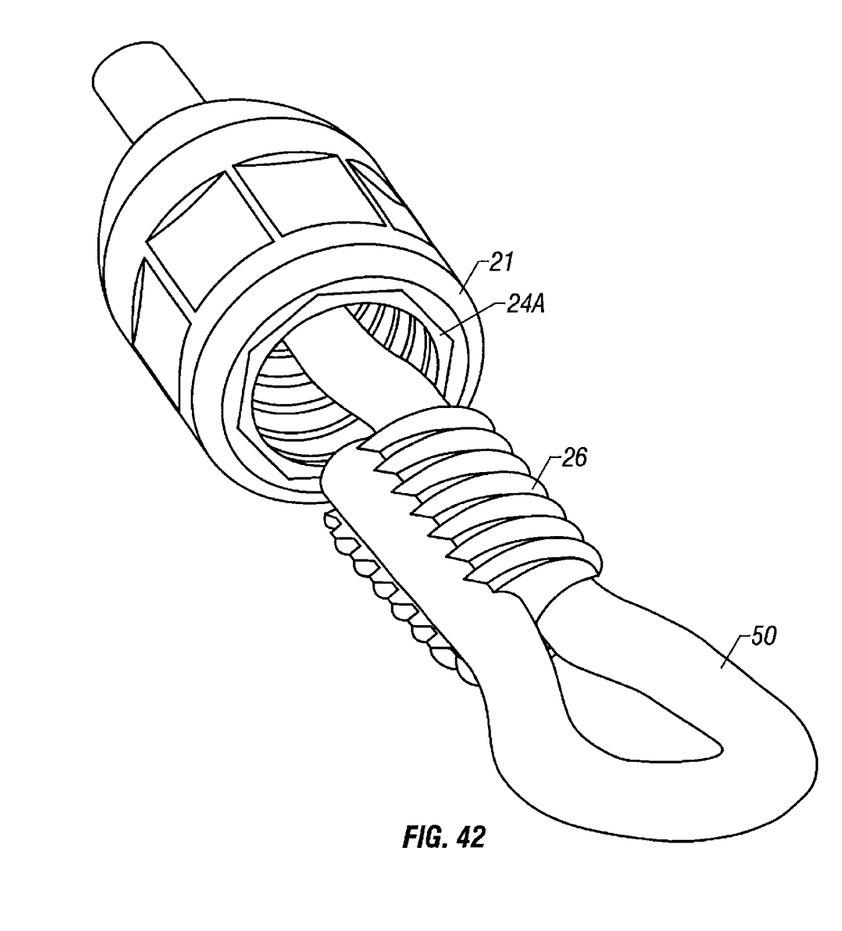
FIG. 42 shows the embodiment of FIG. 26 of the splicing nut with the nut inserts in the nut housing and a line in the core.
Figure 43:
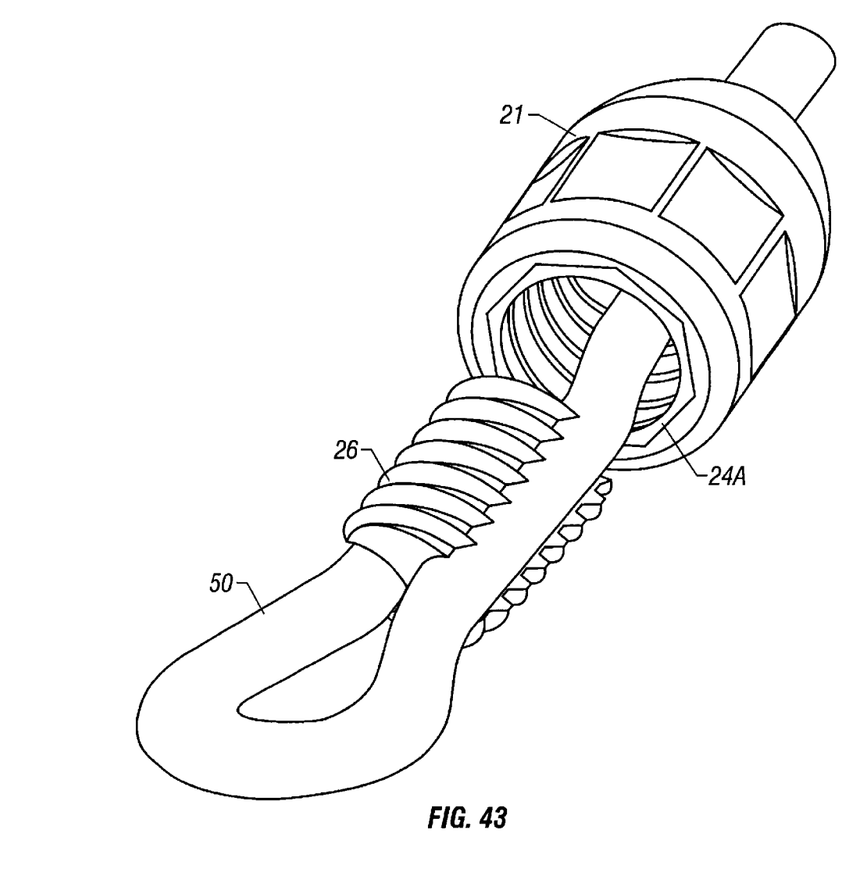
FIG. 43 shows the embodiment of FIG. 26 of the splicing nut with the nut inserts in the nut housing and a line in the core.
Figure 44:
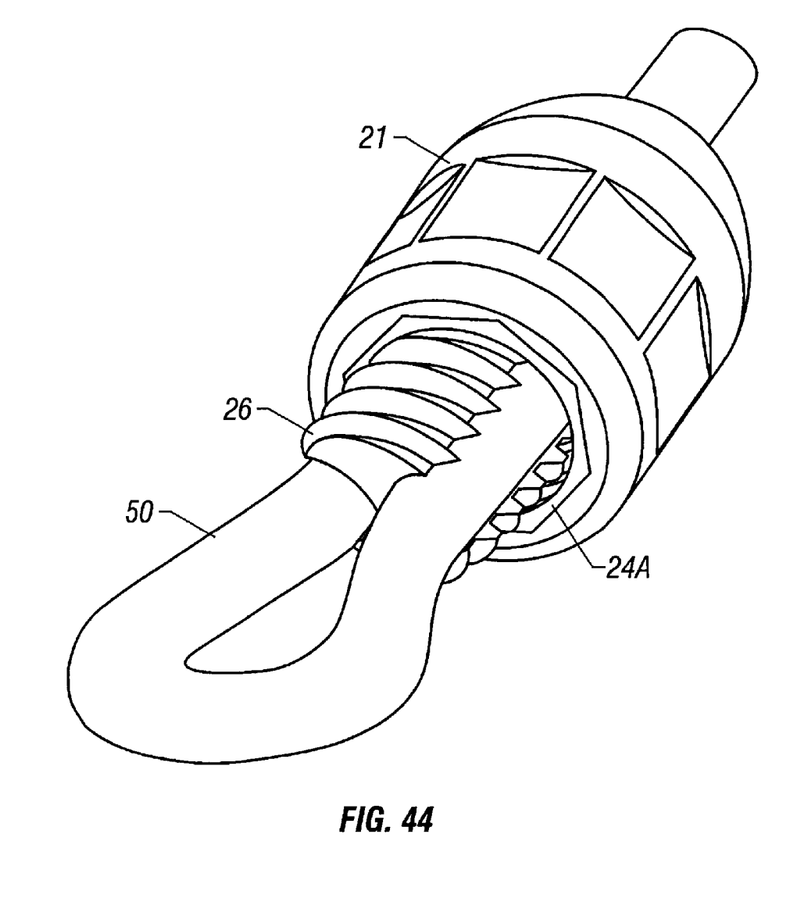
FIG. 44 shows the embodiment of FIG. 26 of the splicing nut with the nut inserts in the nut housing, a line in the core, and the core in the nut inserts and nut housing.
Figure 45:
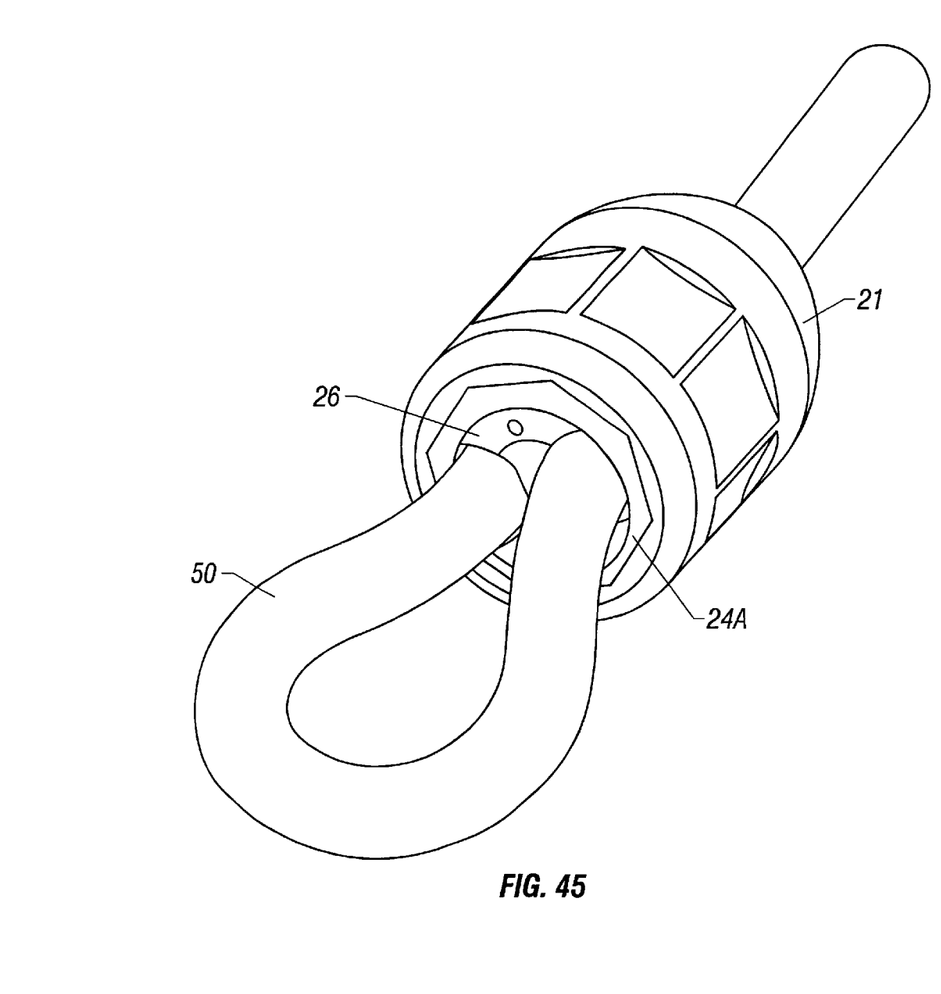
FIG. 45 shows the embodiment of FIG. 26 of the splicing nut with the nut inserts in the nut housing, a line in the core, and the core in the nut inserts and nut housing.

FIGS. 41–45 show the second embodiment in various stages of assembly. The proper assembly of the splicing nut is shown. FIG. 42 shows an exploded view of the second embodiment omitting one necessary nut insert 24B for clarity. One possible assembly sequence proceeds as follows: First, the nut inserts 24A and 24B are inserted into the nut housing 21. Second, an end of a line 50 is passed through the hole 22 in the top end of the nut housing 21 and out of the nut housing 21 through the bottom end of the nut housing 21. The line 50 is then situated in the core 26 as shown in FIG. 42 so that two regions of the line 50 are laid in the slots 27 and a loop of the line 50 is formed between the two slots 27. Another view is shown in FIG. 43. Finally, the core 26 is threaded into the nut inserts 24A and 24B and tightened.

Tightening is accomplished by applying opposing torque to the nut housing 21 and the core 26. A torque can most easily be applied to the nut housing 21 with a wrench or similar tool positioned to grip the faces 23 on the nut housing 21. The torque can be applied to the core 26 using a tool which grips the core 26 by attaching to two holes 28 in the bottom of the core 26. For example, wire spanners 52, as shown in FIG. 55, may be used to tighten the core 26 if the core 26 has holes 28. The embodiment of the core 26 shown in FIGS. 17–21 may be tightened using a common wrench. Alternatively, the line may be twisted relative to the nut housing 21, thereby twisting the core 26 with the line relative to the nut housing 21.

If the loop of the line is to be attached to another device, the line may be passed through or around the other device before the line is looped. Additionally, the section of line that forms the loop can be protected by the use of a thimble. The thimble is inserted into the loop of line and the loop is tightened to secure the loop around the thimble before the core 26 is tightened into the nut inserts 24A and 24B.

Figures 46, 47:
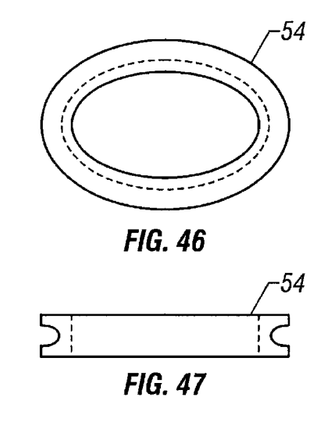
FIG. 46 shows a plan view of a closed thimble.
FIG. 47 shows an elevation view of the closed thimble of FIG. 46.
Figure 48:
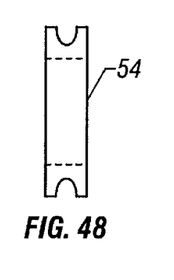
FIG. 48 shows an elevation view of the closed thimble of FIG. 46.
Figure 49:
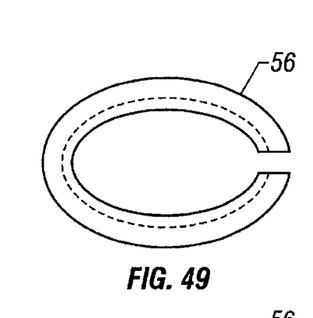
FIG. 49 shows a plan view of an open thimble.
Figure 50:
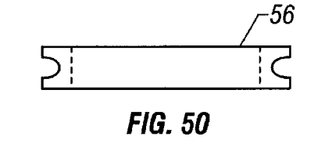
FIG. 50 shows an elevation view of the open thimble of FIG. 49.
Figure 51:
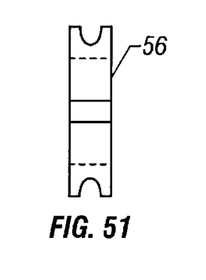
FIG. 51 shows an elevation view of the open thimble of FIG. 49.
Figure 52:
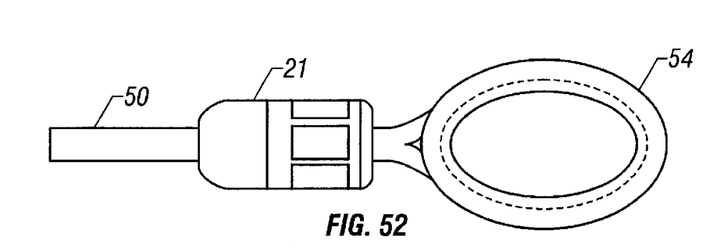
FIG. 52 shows a plan view of the thimble, splicing nut, and line.
Figure 53:
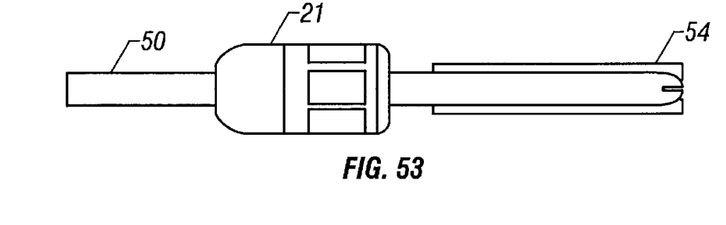
FIG. 53 shows an elevation view of the thimble, splicing nut, and line of FIG. 52.

The use of the thimble is illustrated in FIGS. 46–54. A closed thimble 54 is shown in FIGS. 46–48. FIG. 46 is a plan view, and FIGS. 47 and 48 are elevation views orthogonal to FIG. 46. FIGS. 49–51 illustrate an open thimble 56. FIG. 49 is a plan view, and FIGS. 50 and 51 are elevation views orthogonal to FIG. 49 FIG. 52 is a plan view of the closed thimble 54, splicing nut 21, and line 50 with the thimble 54 inserted into the loop of the line 50. FIGS. 53 and 54 are elevation views orthogonal to FIG. 52.

Assembly for the splicing nut of the first embodiment is accomplished in a similar manner, the primary difference being that no nut inserts 24A and 24B are used. Instead the core 2 is threaded directly into the nut 1.

The assembled splicing nut provides a lightweight, strong means of attaching the end of a line to the line to form a loop. As illustrated by the above description and the figures, the splicing nut requires little time or skill to install. Additionally, the splicing nut can easily be reused or repositioned for adjustment of line length or to prevent line wear, thus extending the life of the line.

What is claimed is:

1. A splicing nut comprising:
    a nut portion, said nut portion having an end, a hole extending inward from said end, said hole defining an inside surface, and threads disposed on said inside surface of said hole; and
    a core configured to be capable of being threaded into said nut portion, said core generally defined by a solid cylindrical body having a top end, a bottom end opposing said top end, an outer surface connecting said top end and said bottom end, threads disposed on said outer surface, said threads capable of mating with said threads on said inside surface of said nut portion, and a plurality of slots disposed at said outer surface of said core, each of said slots extending inward from said outer surface of said core partway to a center of said core, each of said slots being shaped so as to be capable of receiving a line.

2. A combination comprising the splicing nut of claim 1 and a line wherein:
    each said slot extends a distance inward from said outer surface of said core, said distance being less than the diameter of said line, such that when said core is threaded into said nut portion a part of said line touches, and is compressed between, the inside surface of said nut portion and said slot.

3. The combination of claim 2 wherein:
    said line is sufficiently compressed between said inside surface of said slot and said inside surface of said nut portion that said line is prevented from being pulled from said slot.

4. The combination of claim 2 further comprising:
    a thimble, said thimble being able to be inserted in, and secured by, a loop of said line, said loop being secured by said splicing nut.

5. The splicing nut of claim 1 and further comprising:
    at least one rib in each slot of said core, said rib defined by a constriction in said slot, said rib causing said line to be compressed between said rib and said inside surface of said nut portion when said line is passed through said slot and said core is threaded into said nut portion.

6. The splicing nut of claim 1 wherein said core comprises:
    one or more features, said features enabling a tool to be inserted into said core for the purpose of applying a torque to said core.

7. The splicing nut of claim 1 wherein said nut portion comprises:
    a plurality of flat surfaces on the exterior of said nut portion, said flat surfaces enabling a tool to grip said nut portion for the purpose of applying a torque to said nut portion.

8. The splicing nut of claim 1 wherein each of said slots comprises a pair of sidewalls and a centering groove between said sidewalls.

9. The splicing nut of claim 8 wherein said sidewalls are parallel to each other.

10. The splicing nut of claim 8 wherein said centering groove comprises a plurality of ribs.

11. A splicing nut comprising:
    a nut portion, said nut portion having an end, a hole extending inward from said end, said hole defining an inside surface, and threads disposed on said inside surface of said hole; and
    a core configured to be capable of being threaded into said nut portion, said core generally defined by a cylindrical body having a top end, a bottom end opposing said top end, an outer surface connecting said top end and said bottom end, threads disposed on said outer surface, said threads capable of mating with said threads on said inside surface of said nut portion, and a plurality of slots, said slots extending inward from said outer surface of said core, said slots being capable of receiving a line, wherein said nut portion comprises:
- a nut housing, said nut housing having an end and a hole extending inward from said end, said hole defining an inside surface, said inside surface comprising a plurality of flat surfaces; and
- a nut insert having an outer surface, said outer surface significantly matching the shape of said inside surface of said nut housing, and an inner surface defined by threads.

12. The splicing nut of claim 11 wherein said nut insert comprises one or more parts.

13. A method of securing a line comprising the steps of:
providing a core, said core generally defined by a cylindrical body having a top end, a bottom end opposing said top end, an outer surface connecting said top end and said bottom end, threads disposed on said outer surface, and a plurality of slots, said slots extending inward from said outer surface of said core partway to a center of said core and being capable of receiving said line;
inserting a line in a first and a second of said slots in said threaded core; and
screwing said core into a nut, said nut comprising a hole and a threaded inner surface, said threads on said inner surface mating with said threads on said outer surface of said core, said screwing causing said line to be compressed between said core and said nut in said first and second slots.

14. The method of claim 13 further comprising:
forming a loop of said line between said first slot and said second slot before screwing said core into said nut and securing said loop of said line by screwing said core into said nut.

15. The method of claim 13 further comprising:
applying a torque to said core using a tool which engages one or more holes in said core.

16. The method of claim 13 further comprising:
applying a torque to said nut using a tool which engages a plurality of flat surfaces on the exterior of said nut.

17. The method of claim 13 further comprising:
inserting a thimble in a loop of said line, said loop being secured by said splicing nut.

18. A line and splicing nut combination comprising:
a splicing nut, said splicing nut comprising:
- a nut portion comprising an end, a hole extending inward from said end, and a threaded inside surface; and
- a core threaded into said nut portion, said core having an outer surface which mates with said threaded inside surface of said nut portion, a plurality of slots being formed in said outer surface and being aligned parallel to an axis of said core, and a line, a first section of said line being disposed in a first one of said slots, a second section of said line being disposed in a second one of said slots, said first and second sections of said line being compressed between said nut portion and said core, a third section of said line intermediate between said first and second sections extending through said hole and forming a loop in said line external to said splicing nut.

19. The combination of claim 18 wherein each of said slots comprises a plurality of ribs.

20. The combination of claim 18 wherein said line is a common rope.

21. The combination of claim 20 wherein said rope is braided.

22. The combination of claim 18 comprising a thimble disposed in said loop.

23. The combination of claim 18 wherein said core contains at least a third slot, a fourth section of said line being disposed in said third slot.

* * * * *